Aug. 24, 1965    S. F. GOODFRIEND    3,202,123
MARINE ENGINE COOLING COUPLER
Filed Aug. 15, 1962
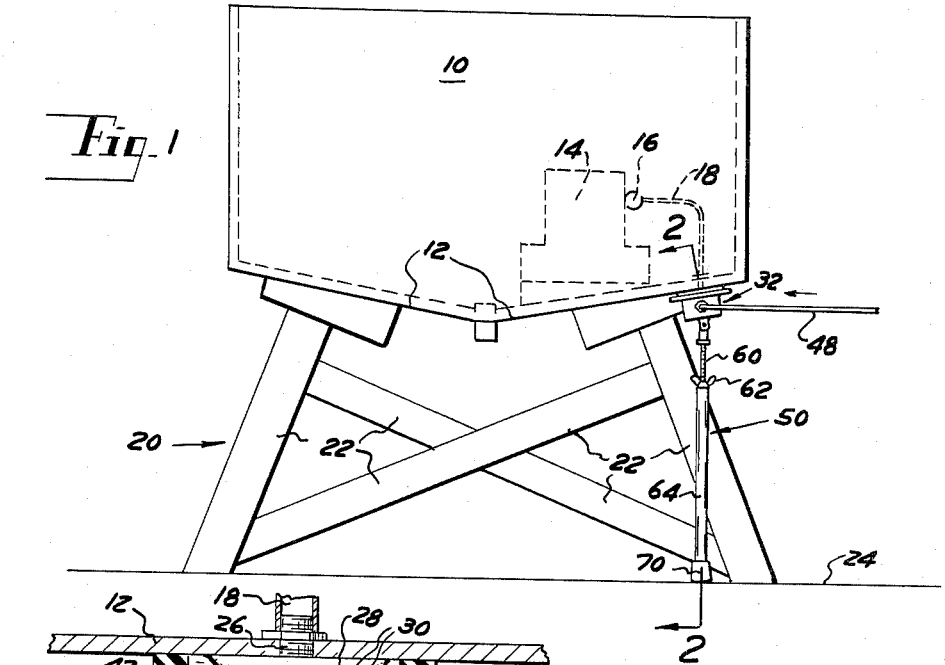
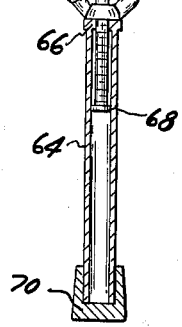
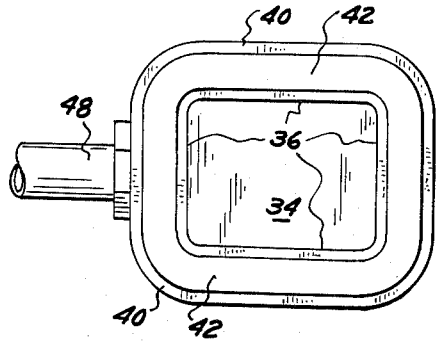
INVENTOR
SYDNEY F. GOODFRIEND
COLMAN, NORD & KRASS
BY
ATTORNEY

United States Patent Office 3,202,123
Patented Aug. 24, 1965

3,202,123
MARINE ENGINE COOLING COUPLER
Sydney F. Goodfriend, Huntington Woods, Mich., assignor of one-half to Cyril Feldman, Detroit, Mich.
Filed Aug. 15, 1962, Ser. No. 217,122
1 Claim. (Cl. 115—.5)

This invention relates to engine cooling devices and more particularly to a device for coupling an engine in a boat to a water supply when the boat is out of water.

The engines mounted interiorly of a marine vessel generally rely upon the water which supports the vessel to cool the engine during its operation. This is accomplished by pumping the water into the engine through a water intake scoop mounted on the hull of the vessel.

When the vessel is not in a body of water, however, some other means must be provided for introducing water into the engine before the engine can be operated. This is important when repairs are being made upon the engine necessitating its removal from the water, and the engine must be operated to test its performance.

This is usually accomplished by disconnecting the interior water feed lines of the engine and reconnecting them directly to a source of water. The only alternative method for cooling the engine has been to return the vessel to a body of water during the period of engine operation.

It is therefore the object of the present invention to provide a device for introducing water to a water-cooled engine mounted in a marine vessel without the mechanical alteration of the engine assembly and without immersing the hull of the vessel in a body of water.

The present invention accomplishes this object by providing a cup-like member having an opening in its side adapted to receive a standard water conduit connection such as a hose. An adjustable jack hinge-connected to the outer lower portion of the cup maintains the open face of the cup of the vessel and over the water intake scoop by bracing firmly between the hull and any adjacent substantially rigid structure which is convenient. Water is introduced into the cup through the hose and is drawn into the engine through the water inlet scoop. The hinged connection between the jack and the cup permits great flexibility as to the location of the rigid supporting structure with respect to the hull and inlet scoop. In addition, the device is adaptable to any type or shape of hull. By employing a cup of sufficient size, the device is applicable to intake scoops of a wide range of sizes and shapes.

Other objects and advantages will be more readily apparent from the following detailed description of a preferred embodiment of the present invention. The description makes reference to the drawings in which:

FIGURE 1 is an elevational view showing a marine vessel and engine mounted in a cradle with the device of the present invention connected to the hull;

FIGURE 2 is a sectional view taken on the lines 2—2 in FIGURE 1;

FIGURE 3 is a plan view of the cup member of the present invention.

Referring to the drawings in detail, FIGURE 1 shows a marine vessel 10 having a hull 12. A water-cooled engine 14 is mounted interiorly of the vessel 10. A pump 16 is adapted to pump water up through a water feed line 18 and into the engine 14. The vessel 10 is shown resting in a cradle 20 constructed of connected timbers 22 supported by a floor 24.

As shown in FIGURE 2, the water feed line 18 terminates at its lower end in an opening 26 in the hull 12. A water intake scoop 28 of generally cup-shaped design and having horizontal ports 30 fits against the outside of the hull 12 over the opening 26.

The present invention is illustrated as comprising a cup-shaped member 32 having a bottom wall 34, side walls 36, and an open upper face 38. A projecting seat 40 extends outwardly from the side walls 36 and is adapted to hold a ring or loop of resilient fluid-tight material 42, such as rubber. The resilient material 42 extends upwards above the level of the projecting seat 40.

An opening 44 in one of the side walls 36 is adapted to receive the threaded collar end 46 of a hose or pipe 48 connected to a suitable source of water.

A jack, generally indicated at 50, is pivotally connected by means of a pin 52 to a grooved projection 54 extending vertically downward from the bottom wall 34 of the cup member 32. The pin 52 passes through the projection 54 and through the end of a short stem 56, thus holding the stem in a pivotable position. Alternately, a ball joint may be use. The stem 56 terminates at its other end in a socket 58 into which a threaded rod 60 is journaled. A nut 62 is rotatably mounted along the length of the rod 60. A tube 64, slidably mounted along the rod 60, terminates at its end closest to the cup 32 in a collar section 66 having a smaller inner diameter than the remainder of the tube. When the tube 64 is slid downwards along the rod 60, the collar section 66 contacts a flange section 68 at the lower end of the rod of greater diameter than the remainder of the rod. This prevents the tube from being pulled off of the rod. A guard 70 of suitable resilient material fits over the lower end of the tube 64 and prevents the marring of the supporting surface.

In operation, the cup 32 is placed with its open face 38 over the intake scoop 28 so that the resilient material 42 fits in fluid-tight manner against the hull 12. The nut 62 is rotated so as to move down the rod 60 and push the tube 64 in the same direction until the guard 70 contacts a suitable supporting surface. This supporting surface may be the surface of any fixed structure adjacent to the intake scoop 28. In FIGURE 1, the floor 24 is employed as a supporting surface although the cradle timbers 22 might also have been used. The hinged cup 32 is shown as tilted to fit against a hull 12 having substantial pitch.

The nut 62 is tightened until the jack 50 is rigidly braced between the supporting structure and the vessel's hull 12. Water is then introduced through the hose 48 into the cup 32 where it is moved through the intake scoop 28 and feed line 18 into the engine 14 by the action of the pump 16 and/or the pressure in the hose.

Having described my invention, I claim:

A device for coupling a source of water to a hull-mounted water intake scoop in a marine vessel situated externally of a body of water, comprising:
 a cup-shaped member having an opening in a side wall adapted to connect to a source of water, the open face of said member being adapted to fit against said hull surrounding said scoop;
 resilient material along the edges of said open face adapted to maintain a fluid-tight seal about said scoop;
 a stem pivotally connected to the exterior of the bottom wall of said member;
 a threaded rod journaled in said stem;
 a nut threaded mounted upon said rod;
 and a tube slidably mounted along said rod, whereby rotation of said nut in the direction causing it to move away from said member causes said tube to be moved in the same lineal direction as said nut.

References Cited by the Examiner
UNITED STATES PATENTS

| | | | |
|---|---|---|---|
| 1,371,485 | 3/21 | Howard | 114—228 |
| 1,800,310 | 4/31 | McGee | 114—16.8 |
| 2,500,404 | 3/50 | Donnelly | 285—9 X |
| 2,807,478 | 9/57 | Hermann et al. | 285—9 X |
| 2,876,026 | 3/59 | Mancini | 285—9 X |

MILTON BUCHLER, *Primary Examiner.*
ANDREW H. FARRELL, *Examiner.*